April 16, 1940.   W. B. LOUTHAN   2,197,699
CLAY PIN MAKING APPARATUS
Filed June 9, 1938
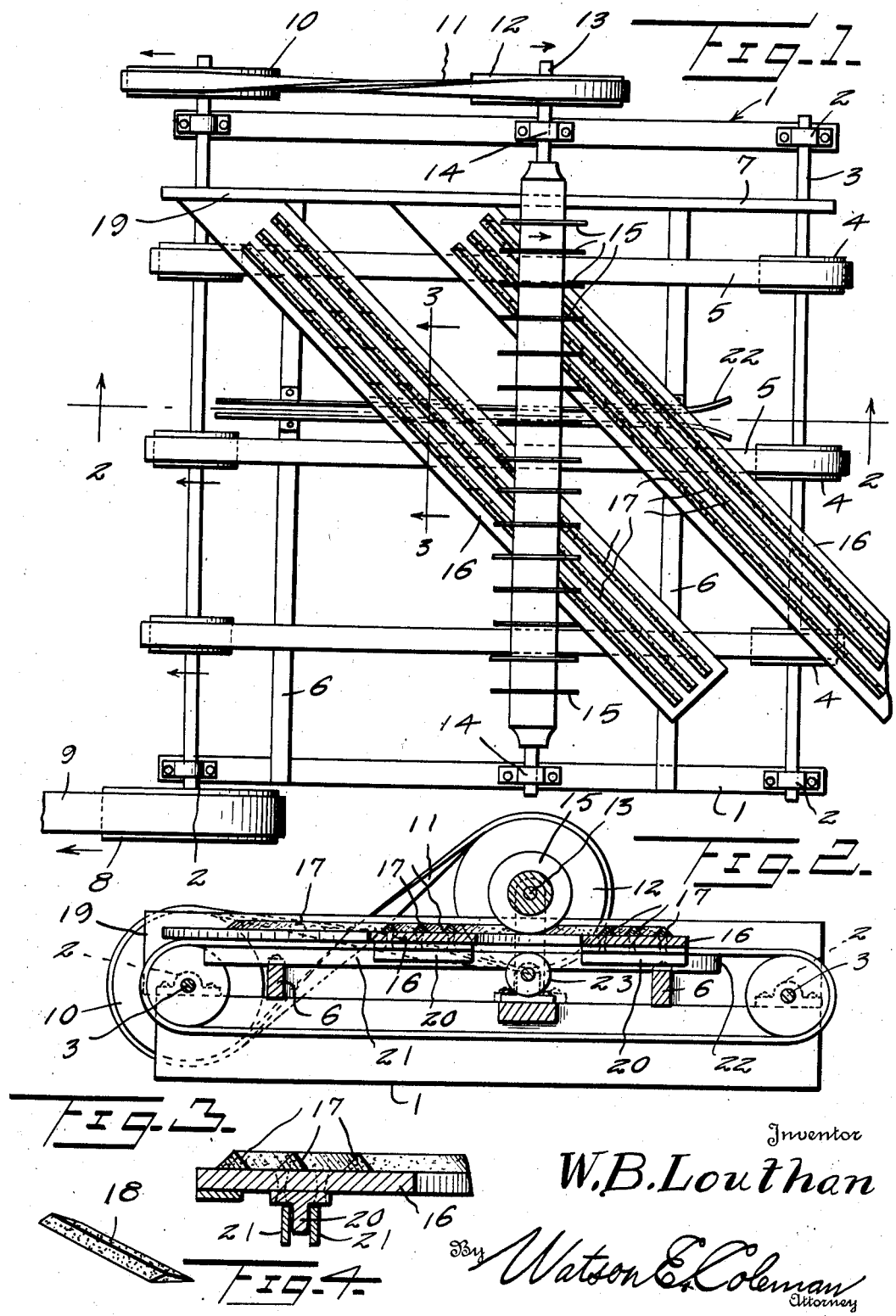
Inventor
W. B. Louthan
By Watson E. Coleman
Attorney Patented Apr. 16, 1940

2,197,699

UNITED STATES PATENT OFFICE 2,197,699

CLAY PIN MAKING APPARATUS

William B. Louthan, East Liverpool, Ohio, assignor to The Louthan Manufacturing Co., East Liverpool, Ohio, a corporation of Ohio Application June 9, 1938, Serial No. 212,844

2 Claims. (Cl. 25—105)

This invention relates to the manufacture of clay pins of the character employed by potters for spacing apart glazed pottery ware during the process of firing and pertains more particularly to an improved mechanism for cutting such pins.

The present invention has for its primary object to provide an improved and novel mechanism for cutting strands of clay which have been extruded from an extruding machine onto supporting boards, for the formation of pins having both ends cut off at an oblique angle, preferably about 45°.

Another object of the invention is to provide a machine for cutting pins of the character above described, in which novel means is employed for moving boards carrying clay strands beneath cutting knives and maintaining such boards and strands at the desired angle with respect to the knives while the cutting of the strands is taking place so that the ends of the pins formed as a result of cutting the strands will be angled at the desired degree.

A further and more specific object of the invention is to provide a machine in which a plurality of rotary knives is disposed above and in parallel relation with endless conveyor belts with novel means for carrying clay strand supporting boards beneath the knives by the belts at a desired angle relative to the knives so that the knives will cut the board carried clay strands in the desired lengths and with ends formed at a prescribed angle.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 is a view in top plan of a machine constructed in accordance with the present invention, showing the use of the same in cutting clay strands.

Figure 2 is a longitudinal section taken on the line 2—2 of Figure 1.

Figure 3 is a sectional view on line 3—3 of Figure 1.

Figure 4 is a perspective view of a pin formed on the machine.

Referring now more particularly to the drawing there is shown a frame structure consisting of spaced parallel side beams 1 which support bearings 2 at their ends and connecting these beams are shafts 3 which have their ends mounted in the bearings 2 for rotation. Each of the shafts 3 carries a series of endless conveyor belt pulleys or wheels 4, the pulleys of one shaft being in alinement with the pulleys of the other shaft so that the connecting conveyor belts 5 may be engaged about the alined pulleys to extend longitudinally of the machine between the beams 1 and parallel therewith.

Extending transversely of the machine between the upper and lower runs of the endless belts 5 are bars 6 which may be supported in any suitable manner as by securing them at one end to one of the side beams 1, as shown in Figure 1. The opposite ends of the bars 6 terminate between the adjacent side beam 1 and the belt 5 nearest thereto and are connected with and joined together by a guide board 7 which parallels the belts 5, as shown.

One of the shafts 3 has mounted upon one end a drive pulley 8 for connection with a suitable drive belt 9, while the other end of the shaft carries the pulley 10 which is connected by the belt 11 with the pulley 12 which is mounted upon an end of a knife carrying or cutter shaft 13. The shaft 13 extends transversely of the structure across the side beams 1 and is supported in the bearings 14 and in the portion of this shaft lying between the guide board 7 and the oppositely positioned beam 1, a series of disk knives 15 are secured which are concentric with the shaft 13 and are so adjusted that the lowermost points of the peripheries will occupy a plane slightly above the plane in which the top run of the belts 5 lie. As shown, the belt 11 is twisted between the pulleys 10 and 12 so that when the drive pulley 8 is rotated in a counterclockwise direction so as to move the top runs of the endless conveyor belts 5 to the left or in the direction of the arrows and, at the same time, rotate the shaft 13 and the disk knives 15 carried thereby, in the opposite direction, this will result in the lower edges of the turning knives moving in the same direction as the top runs of the conveyor belts.

The numeral 16 designates the carrier boards on which are extruded from the extruding machine the triangular strands of clay which are indicated by the numeral 17 and which are cut to form the clay pins such as the one shown in Figure 4 and indicated generally by the numeral 18. These carrier boards are cut at an angle at one end, as indicated at 19, and the boards 16, after receiving their charges of clay strands, are placed on the conveyor belts 5 with these angle ends flat against the guide board 7 so as to be carried forwardly beneath the rotating knives to effect the cutting of the strands obliquely. The ends of the boards may be angled in a suitable manner to effect the cutting of the strands so that the ends of the pins obtained will be at an angle other than 90°, the preferred angle being 45°. In order to maintain the boards at the proper angle upon the conveyors each board has secured transversely of its under face a guide shoe which is, of course, parallel with the edge 19 and, therefore, at the same angle as this edge with respect to the length of the board and secured longitudinally of the mechanism across and to the tops of the bar 6 are the spaced guide rails 21 which parallel the guide board 7 and are adapted to have the board carried guide shoes slide therebetween. These rails 21 at the entrance end of the channel which they form for guiding the shoes 20, are curved slightly laterally, as indicated at 22, to facilitate starting the board on its movement beneath the rotating disk knives.

The space between the knives 15 and the plane of the top surfaces of the top runs of the conveyor belts, is substantially equal to the thickness of the boards 16 so that it will be readily apparent that the clay strands will be completely cut through as they are carried beneath the knives on the boards.

In order that the weight of the boards will not cause the conveyor belts to sag and thus prevent the proper cutting of the clay strands, there may be placed beneath the top runs of the conveyor belts directly below the shaft 13, supporting rollers 23, as illustrated in Figure 2.

From the foregoing, it will be readily apparent that with the machine herein described, there may be formed clay pins of the usual triangular form, having both ends cut at an angle, preferably 45°, thus giving a pin having a usable point on both ends. In addition, the angular cut of the pin gives a sharper point so that the formation of pin marks on the china in association with which the pins are used, is reduced to a minimum. The provision of the pins with the double point also effects saving in time in connection with placing the china ware in position for firing as the user of the pins is not required to turn the pin in his hand in order to bring a pointed end into proper position as it is necessary for him to do in the use of pins in which only one end is pointed.

I claim:

1. A clay pin cutting machine comprising an endless conveyor structure, a shaft extending transversely of the conveyor structure, a plurality of disk knives supported upon said shaft for rotation thereby, said knives having their cutting edges in parallel planes lying perpendicular to the plane of movement of the conveyor, a clay strand supporting board disposed upon and carried by the conveyor beneath said knives, a guide unit extending parallel with the direction of travel of the conveyor, and means carried by said board and engaging said guide to maintain the board at a predetermined oblique angular relation to the conveyor and the said planes of the cutting edges of the knives.

2. A clay pin cutting machine comprising an endless conveyor structure, a shaft extending transversely of the conveyor structure, a plurality of disk knives supported upon said shaft for rotation thereby, said knives having their cutting edges in planes perpendicular to the plane of movement of the conveyor, a clay strand supporting board resting upon and carried by the conveyor beneath said knives, a guide unit extending parallel with the direction of travel of the conveyor, a shoe secured transversely of said board at an angle oblique to the length thereof and engaged by said guide, a guide board extending lengthwise of the conveyor at one side of the same and parallel with the direction of travel of the conveyor, and said first board having an end edge cut to substantially parallel said shoe and engaging against said guide board.

WILLIAM B. LOUTHAN.